(12) United States Patent
Loeser et al.

(10) Patent No.: US 8,402,899 B2
(45) Date of Patent: Mar. 26, 2013

(54) MAGNETICALLY LEVITATED RAILWAY

(75) Inventors: Friedrich Loeser, Riemerling (DE); Qinghua Zheng, Taufkirchen (DE); Luitpold Miller, Ottobrunn (DE)

(73) Assignee: ThyssenKrupp Transrapid GmbH, Kassel (DE)

( * ) Notice: Subject to any disclaimer, the term of this patent is extended or adjusted under 35 U.S.C. 154(b) by 335 days.

(21) Appl. No.: 12/746,955

(22) PCT Filed: Nov. 28, 2008

(86) PCT No.: PCT/DE2008/001972
§ 371 (c)(1),
(2), (4) Date: Jun. 9, 2010

(87) PCT Pub. No.: WO2009/074128
PCT Pub. Date: Jun. 18, 2009

(65) Prior Publication Data
US 2010/0269729 A1    Oct. 28, 2010

(30) Foreign Application Priority Data
Dec. 10, 2007 (DE) .......... 10 2007 059 504

(51) Int. Cl.
*B60L 13/04* (2006.01)
(52) U.S. Cl. ...................... 104/281; 104/282
(58) Field of Classification Search ......... 104/281–286
See application file for complete search history.

(56) References Cited

U.S. PATENT DOCUMENTS

| | | | | |
|---|---|---|---|---|
| 4,636,667 A | * | 1/1987 | Holzinger et al. | 310/13 |
| 4,868,431 A | * | 9/1989 | Karita et al. | 310/12.24 |
| 4,912,746 A | * | 3/1990 | Oishi | 310/12.01 |
| 5,744,879 A | * | 4/1998 | Stoiber | 310/12.21 |
| 6,713,899 B1 | * | 3/2004 | Greubel et al. | 310/12.18 |
| 6,919,654 B2 | * | 7/2005 | Harned et al. | 310/12.01 |
| 6,949,846 B2 | * | 9/2005 | Sugita et al. | 310/12.15 |
| 7,317,266 B2 | * | 1/2008 | Beakley et al. | 310/12.19 |
| 7,362,012 B2 | * | 4/2008 | Godkin | 310/12.25 |
| 8,076,804 B2 | * | 12/2011 | Jajtic et al. | 310/12.19 |
| 2008/0236973 A1 | * | 10/2008 | Hahn et al. | 191/10 |
| 2008/0252405 A1 | * | 10/2008 | Becker et al. | 335/291 |
| 2010/0269729 A1 | * | 10/2010 | Loeser et al. | 104/282 |

FOREIGN PATENT DOCUMENTS

| | | |
|---|---|---|
| DE | 30 41 940 | 6/1982 |
| DE | 34 10 119 | 10/1985 |
| DE | 198 29 052 | 12/1999 |
| DE | 10 2004 012 748 | 10/2005 |
| DE | 10 2004 056 439 | 10/2005 |
| EP | 1 322 027 | 6/2003 |

* cited by examiner

*Primary Examiner* — Jason C Smith
(74) *Attorney, Agent, or Firm* — Michael J. Striker

(57) ABSTRACT

The invention relates to a maglev railway comprising a support and drive system of the long stator-linear motor type, magnetic support poles that are situated in the vehicle being additionally provided with linear generator windings (10) that generate electric energy in the vehicle. The aim of the invention is to prevent unwanted, periodic vibrations (ripples) from being generated at low speeds. To achieve this, according to the invention, the teeth (5) and grooves (6) of the long stator (3) are arranged in high-speed sections (2a) parallel to the cores and the linear generator windings (10) of the support magnets provided in said cores and in low-speed sections (2b) obliquely to said cores (7) and linear generator windings.

5 Claims, 3 Drawing Sheets

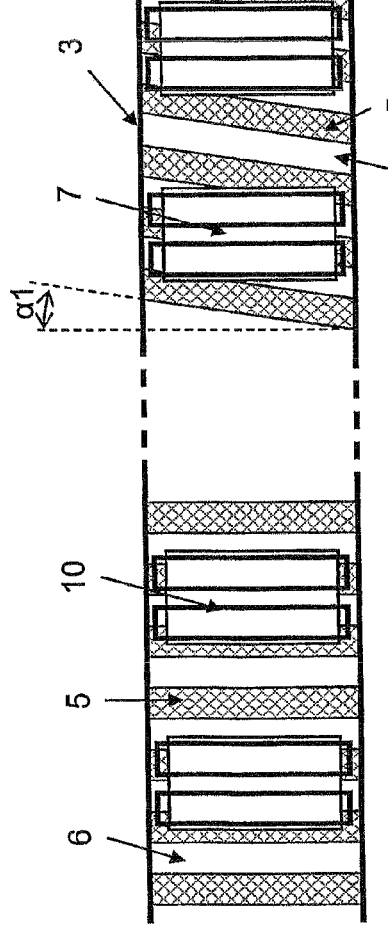
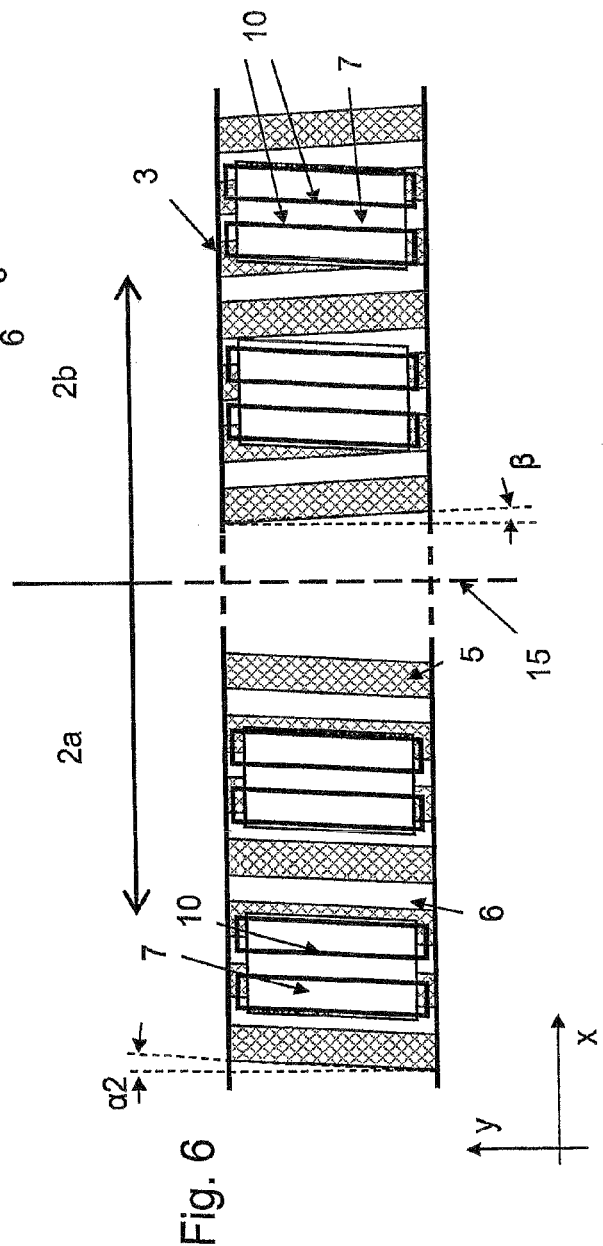
Fig. 5
Fig. 6

MAGNETICALLY LEVITATED RAILWAY

The present invention relates to a magnetically levitated railway.

Known magnetically levitated railways of this type (e.g., DE 30 41 940 C2, DE 10 2004 012 748 A1) are characterized by a combined support, drive, and energy-generation system. The latter is composed of a plurality of interacting components that are mounted on the vehicle and the track.

The "support" function is realized via at least one support magnet that is fastened to the vehicle, and that holds the vehicle in a state of levitation relative to the track during normal vehicle operation. For this purpose, the support magnet includes a plurality of magnet poles which are situated one behind the other in the direction of travel, and that are composed of iron cores and windings that enclose them. The cores form alternating north and south poles, and terminate at a pole plane that is situated opposite a reaction rail installed on the track, at a distance of, e.g., 10 mm, during vehicle operation.

The "drive" function is realized, e.g., using a reaction rail in the form of an elongated stator that is provided with teeth and slots that are situated one behind the other in the direction of travel; a three-phase, alternating current winding is usually inserted into the slots and is used to generate a traveling electromagnetic field that moves in the direction of travel. The elongated stator, including its alternating-current windings, and the support magnets, including the magnetic fields they generate, form a synchronous elongated-stator linear motor that drives the vehicle at the propagation speed of the traveling field. The front and rear—relative to the direction of travel—edges, and the lateral surfaces of the magnetic pole cores, and the teeth of the elongated stator extend perpendicularly to the direction of travel; the tooth/slot separation is, e.g., 86 mm, and the magnetic pole separation is, e.g., 516 mm, or slightly more or less, relative to two like poles.

Various possibilities exist for realizing the "energy generation" function which, within the scope of the present application, is understood to mean the generation of electrical energy in the vehicle. Electrical energy is generated for the purpose of covering the energy demand of the support-magnet windings and other current-consuming assemblies, e.g., air-conditioning systems and lighting systems, that are present in the vehicle, and of open-loop and closed-loop control devices, etc. One possibility for generating energy is to locate contact rails on the track, and to locate current collectors assigned thereto on the vehicle. A further possibility is to situate a primary conductor, which is designed as a transmitter, along the track, and to situate a receive coil, which is assigned to the transmitter, on the vehicle. Finally, it is possible to provide the magnet poles with windings which are placed in the magnet poles and form a linear generator. The windings are permeated by different magnetic fluxes while the vehicle is traveling, depending on whether the applicable magnet pole is situated opposite a tooth or a slot of the elongated stator at that moment; as a result, an electrical voltage is induced in the windings, which is supplied to the various consumers via boost consumers and, if necessary, rectifiers, or it is used to charge batteries which are likewise carried in the vehicle.

The generation of electrical energy using linear generators results in the main advantage that no additional equipment parts are required on the vehicle, such as contact rails, primary conductors, or the like. An unavoidable disadvantage, however, is that linear generators do not begin to operate sufficiently well until high traveling speeds are reached, e.g., speeds above 100 km/h. In the practical application of magnetically levitated railways, it is therefore provided that the track be equipped, in low-speed sections, with additional contact rails, primary conductors, or the like, and/or that the vehicle be equipped with so many batteries that a sufficient quantity of electrical energy may be made available to the vehicle even where the linear generator alone is not sufficient.

A further problem that arises in the operation of a magnetically levitated railway using an elongated-stator linear motor is that, due to the tooth/slot geometry, the support magnets are subject to periodic load changes—which are also influenced by the drive—during travel; these periodic load changes result in periodic changes in forces and pitching moments. The point at which a magnet pole is situated opposite a tooth of the elongated stator is where the full attraction force is attained, while the attraction force is practically zero in the region of a slot of the elongated stator. These continual changes become noticeable as "slot ripples" very particularly in the low-speed sections of the track. At ground speeds of 100 km/h and less, this results in vibrations or a slot ripple having a frequency of approximately 320 Hz and less in a practical embodiment having a tooth/slot separation of, e.g., 86 mm. This is undesirable since the mechanical vibrations that are produced as a result may affect the endurance limit and, therefore, the service life of the track, and it may reduce riding comfort and increase noise. Until now, vibrations of this type were very difficult to dampen, requiring large masses, large quantities of foamed material, or the like. At levels above, e.g., 320 Hz, these vibrations and their consequences are relatively easy to handle, and are therefore less significant.

Proceeding from this, the present invention is based on the technical problem of designing the magnetically levitated railway of the type initially described such that disturbing vibrations or slot ripples in the low-speed sections may be largely prevented even without the use of complex damping means.

This problem is solved, according to the present invention, as described in detail hereinafter.

The present invention provides the advantage that two functions are fulfilled by the fact that the inclination of the teeth and slots of the elongated stator relative to the pole cores of the support magnet is provided only in the low-speed sections. An adequate supply of energy by the linear generators is ensured in the high-speed sections since, in these sections, the parallel nature of the cores and linear-generator windings of the support-magnet poles, and the teeth and slots of the elongated stator ensures that energy transmission is optimal. In addition, the periodic excitations that occur otherwise at low frequencies may be largely eliminated in the low-speed sections, thereby eliminating the need for costly damping measures. The disadvantage resulting from the inclination, namely that less energy may be generated using the linear generators than could be generated without this inclination, because, in this case, the linear-generator windings are always situated opposite only parts of the teeth or slots of the elongated stator, is not considered to be substantial within the scope of the present invention since additional means such as contact rails, batteries, or the like must be provided anyway for the low-speed sections.

Further advantageous features of the present invention result from the dependent claims.

The present invention is explained below in greater detail with reference to the attached drawings of embodiments. In the drawings:

FIGS. 5 and 6 show further embodiments of the present invention for the design of an elongated stator and a support magnet.

Figure 1:
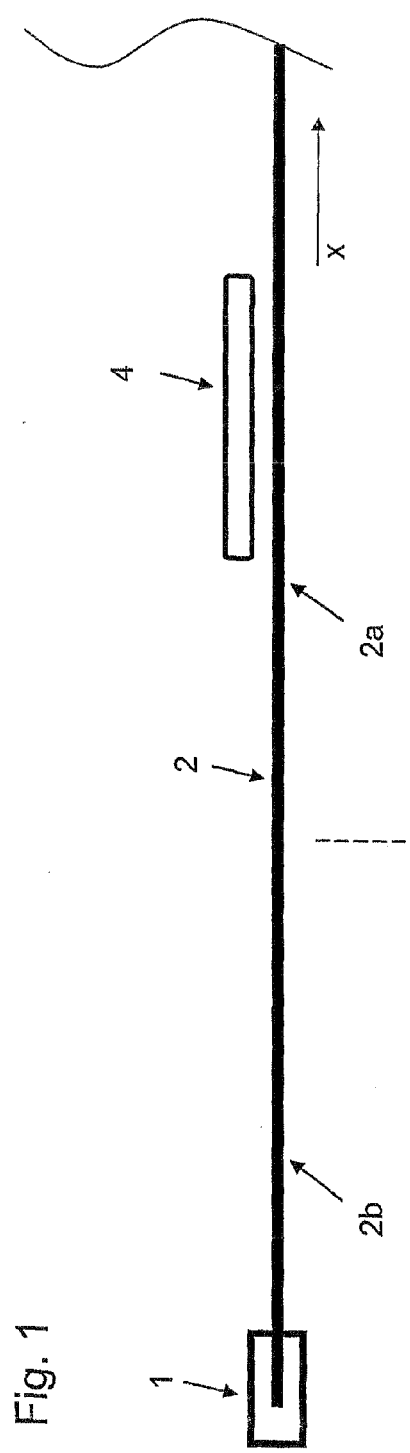
FIG. 1 shows a basic schematic view of the typical design of a track for magnetic levitation railways.
Figure 2:
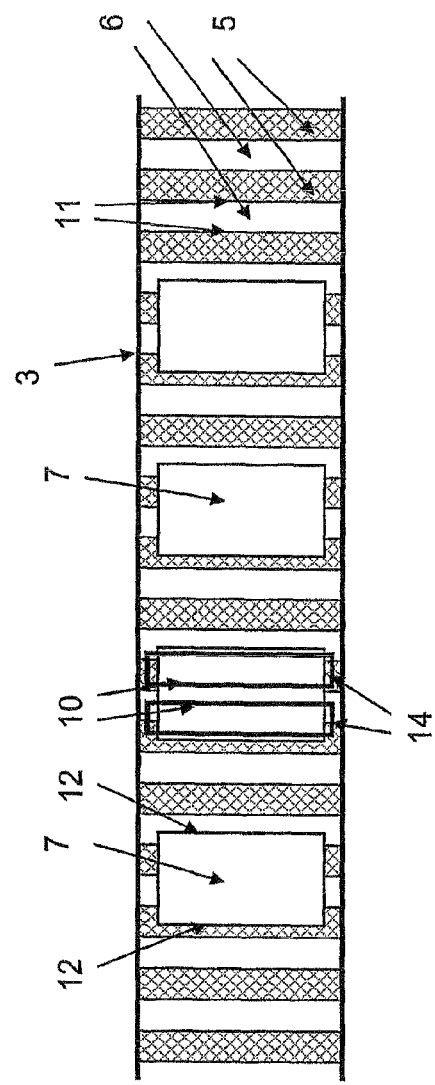
FIG. 2 shows the typical relative position of an elongated stator relative to the support magnets of a magnetically levitated railway.

FIG. 1 shows a schematic depiction of a train station 1 and a track 2, extending away therefrom, of a magnetically levitated vehicle. Track 2 includes, in a known manner, an elongated stator 3, which is depicted schematically in FIG. 2 in an underside view, and includes teeth 5 and slots 6 in alternation in the direction of travel—indicated by an arrow x—of a magnetically levitated vehicle 4 (FIG. 1); alternating-current windings, which are not depicted, are placed in slots 6, in order to generate a traveling electromagnetic field along track 2. Vehicle 4 contains at least one support magnet which includes a plurality of magnet poles of alternating polarity, which are located in succession in direction of travel x. The support-magnet poles include cores 7 which are typically composed of iron, and windings which are not depicted, enclose cores 7, and through which direct current flows, although it would also be possible to also assign permanent magnets thereto. To simplify the depiction, only cores 7 and their outlines are shown in FIG. 2.

Figure 3:
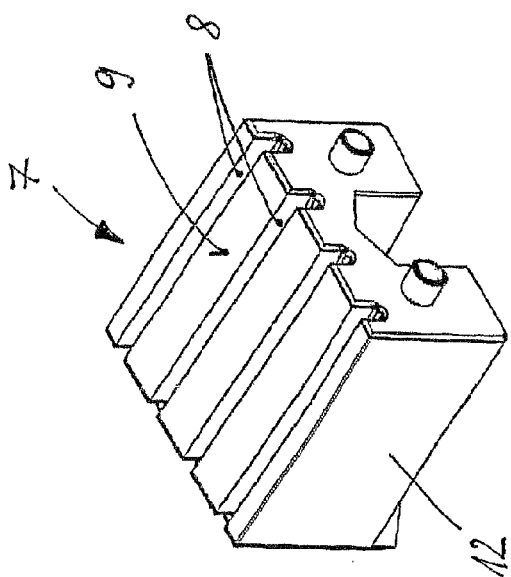
FIG. 3 shows an enlarged depiction of a perspective view of a magnetic pole core of a support magnet of a magnetically levitated vehicle.

FIG. 3 shows a single core 7 of this type, in an enlarged view. Core 7 contains a number of parallel slots 8 that are formed in its magnetic-pole surface 9 which is situated opposite teeth 5 and slots 6 of elongated stator 3. Slots 8 are used to accommodate windings 10—which are shown in FIG. 2—of a linear generator that is suitable for the contactless generation of electrical energy in vehicle 4. The typical relative position of cores 7, windings 10, teeth 5, and slots 6 is likewise indicated in FIG. 2. As indicated, teeth 5 and slots 6 of elongated stator 3 extend substantially perpendicularly to direction of travel x. Strictly speaking, this applies mainly for front and rear—relative to direction of travel x—edges, which are situated parallel to the y direction, and lateral surfaces 11 of teeth 5, which limit slots 6. FIGS. 2 and 3 also show that cores 7 are provided with substantially flat lateral surfaces 12 that, in the installed state, lie parallel to lateral surfaces 11 of teeth 5 of elongated stator 3. Likewise, the slots of cores 7, which are formed in magnetic-pole surfaces 9, are situated parallel to lateral surfaces 12 (FIGS. 2 and 3). Finally, the embodiment is designed overall such that the parts of linear-generator windings 10 that lie in slots 8 are substantially parallel to lateral surfaces 11 and 12, while overhangs 14 of windings 10 are located outside of cores 7 and extend in the x direction, as shown in FIG. 2. The width of windings 10 or their winding windows in the x direction approximately corresponds to the width of a tooth 5 or a slot 6 of elongated stator 3, in order to attain maximum inductive energy generation.

To simplify the subsequent description of embodiments according to the present invention, reference will be made in general only to the directions of teeth 5, slots 6, cores 7, and windings 10 hereinbelow and in the claims. However, it is understood that what is actually meant is the course of the aforementioned edges and lateral surfaces 11 and 12, and of slots 8.

When magnetically levitated vehicle 4 is operated, the support magnets that are present are used to create a state of levitation which results in magnetic-pole surfaces 9 being situated opposite teeth 5 of elongated stator 3 at a distance of, e.g., 10 mm. At the same time, the support magnets provide the excitation field, in a known manner, for the elongated-stator linear motor, which is formed by elongated stator 3, the alternating-current windings situated therein, and the support magnets, and which drives magnetically levitated vehicle 4.

Electrical energy is generated in vehicle 4 during the travel of magnetically levitated vehicle 4 substantially by the fact that, due to the motion of cores 7 relative to elongated stator 3, a continual variation of the air gap that exists between magnetic-pole surface 9 and teeth 5 and slots 6 of elongated stator 3 is induced, and, as a result, the magnetic flux through the linear-generator windings also changes continually. As a result, and as mentioned above, an electrical voltage is induced in windings 10.

The voltage that is delivered by the linear generator is sufficient, at vehicle speeds above, e.g., 100 km/h, to cover the entire energy demand of magnetically levitated vehicle 4 and to charge the on-board batteries that are carried therein. This state is represented in FIG. 1 by a high-speed section 2a of track 2. In contrast, the linear generators in low-speed section 2b of track 2 are not sufficient to cover the energy demand. In low-speed sections 2b, in which vehicle 4, e.g., accelerates away from train station 1, is braked ahead of a train station 1, and is therefore operated at a speed of, e.g., less than 100 km/h, additional means for energy transmission and generation, which are known per se and are therefore not depicted, are provided along track 2.

Magnetic levitation vehicles of the type described herein are known to a person skilled in the art, e.g., from DE 30 41 940 C2, DE 34 10 119 C2, DE 10 2004 012 748 A1, and DE 10 2004 056 439 A1 which are therefore and hereby made the subject matter of the present disclosure via reference, in order to avoid repetition.

Figure 4:
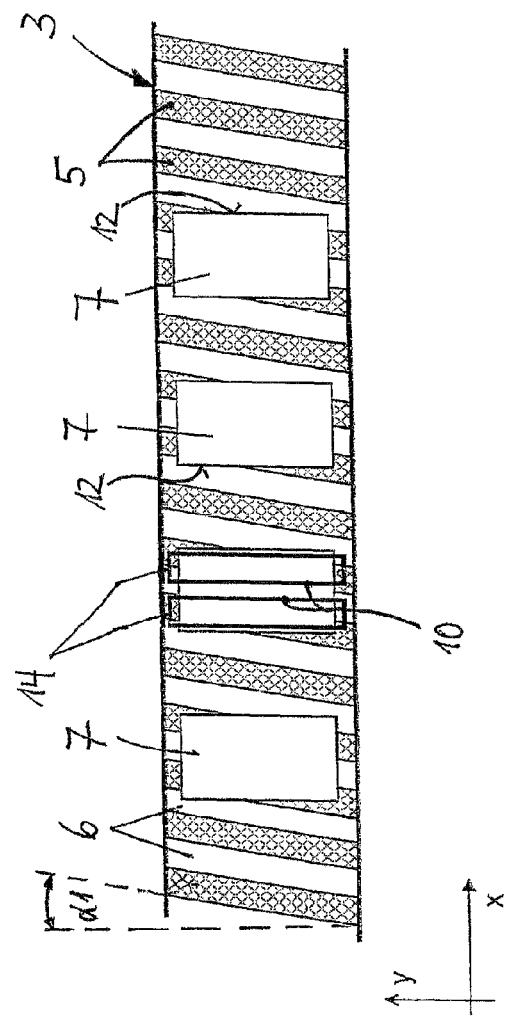
FIG. 4 shows a first embodiment of a design, according to the present invention, of an elongated stator and a support magnet in a low-speed section of the track as shown in FIG. 1.

To prevent the vibrations (slot ripples) that were explained initially and that occur during low-speed travel, it is provided according to the present invention that teeth 5 and slots 6 of elongated stator 3, and cores 7 and windings 10 be situated parallel to each other in high-speed sections 2a, as usual, but that they be situated at a slant relative to each other in low-speed sections 2b, i.e., at an angle that deviates from 0° and is between 0° and 90°. An embodiment of this is shown in FIG. 4. While the support magnets and cores 7 in vehicle 4 are oriented as usual, i.e., with their edges substantially perpendicular to the direction of travel (FIG. 2), all teeth 5 and slots 6 of elongated stator 3 are situated obliquely to direction of travel x. This inclination between cores 7 and teeth 5 and slots 6 has the result that the periodic excitations described initially, which occur at low traveling speeds in particular, e.g., of less than approximately 100 km/h, and at frequencies of, e.g., 320 Hz and less, are greatly reduced and may be minimized via a suitable selection of inclination angle α1 (FIG. 4). The fact that the effect of the linear generators and windings 10—which, similar to cores 7, are situated obliquely relative to teeth 5 and slots 6 of elongated stator 3—is made even worse due to the inclination is not critical, for the reasons stated above.

In contrast, the linear generator functions optimally in high-speed sections 2a, as usual.

The inclination does not substantially influence the drive and support behavior, thereby making it possible for it to be optimized in terms of preventing the slot ripple. To this end, it is advantageous in particular to select inclination angle α1 such that the areas that are covered by both cores 7 and teeth 5 are substantially always of the same size.

The changes to track 2 provided according to the present invention are shown, e.g., in FIGS. 5 and 6.

According to the embodiment depicted in FIG. 5, the configuration that is depicted in FIG. 2 should also be used in a high-speed section 2a. In this case, teeth 5, slots 6, cores 7, and windings 10 are all situated parallel to one another and substantially perpendicular to the direction of travel x, that is, parallel to the y direction. However, in low-speed sections 2b shown in FIG. 5, the inclination explained with reference to FIG. 4 is provided with inclination angle α1, according to which teeth 5 and slots 6 of elongated stator 3 form an angle with direction of travel x that deviates from 90°.

The embodiment depicted in FIG. 6 differs from the embodiment depicted in FIG. 5 in that, in low-speed sections 2a, teeth 5 and slots 6, as well as cores 7 and windings 10 are situated at an angle α2 obliquely to a line that is perpendicular (=y direction) to direction of travel x. As a result, and similar to the configuration depicted in FIG. 2, conditions exist in high-speed sections 2a that are favorable in terms of inductive energy generation using linear generators since cores 7 and windings 10 extend parallel to teeth 5 and slots 6. In low-speed sections 2b shown in FIG. 6, however, teeth 5 and slots 6 of elongated stator 3 are situated in the opposite direction at an angle β obliquely to the y direction. The size of angle β is preferably the same as the size of angle α2, and so teeth 5 and slots 6 in sections 2a and 2b are situated with mirror symmetry to an imagined plane 15 that extends in the y direction. For low-speed sections 2b as shown in FIG. 5, it therefore applies that cores 7 and windings 10 extend obliquely to teeth 5 and slots 6, and the slot ripple is substantially reduced as a result. To obtain inclinations that are the same as those shown in FIG. 5, angles α2 and β are selected, e.g., such that α1=α2+β, and the inclination in low-speed sections 2b shown in FIG. 6 is just as great as that shown in FIG. 5.

Finally, it could be provided according to a further embodiment of the present invention that cores 7 and linear-generator windings 10 be oriented obliquely to the y direction, as shown in FIG. 6, while teeth 5 and slots 6 be situated in high-speed sections 2a as they are shown in the left-hand part of FIG. 6, and that they be situated in low-speed sections 2b as they are shown in FIG. 2.

The present invention is not limited to the embodiments described, which could be modified in various manners. This applies in particular for the size of the tooth/slot period that is provided for an individual case, which may deviate from 86 mm, which was presented as an example, and for the pole division of 516 mm, which was likewise presented as an example. Accordingly, low-speed sections 2b may be designed for speeds that have a limit that differs from the stated limit of approximately 100 km/h, and in which frequencies other than 320 Hz and less result. Depending thereon, different inclination angles α1, α2 and β may prove to be optimal. In every case, the inclination angles should be selected, advantageously, such that periodic excitations and harmful consequences are minimized and eliminated and, as a result, in particular, the mechanical stressing of components and noise generation are reduced. Apart from this, the configuration—which is presented in FIGS. 1 through 6—of elongated stator 3 and the support magnets and their magnet poles is likewise merely one example which may be deviated from as needed. Furthermore, it is clear that the configuration described herein may also be used in train stations or at stopping points in which magnetically levitated vehicles 4 are not always brought to a standstill, or are brought to a standstill only in emergency situations. In these cases, it is only necessary to activate the additional external energy supply or to switch on the on-board batteries while a magnetically levitated vehicle 4 passes through without stopping; this is not a problem at pass-through times of a few seconds. Finally, it is understood that the features described may also be used in combinations other than those described and depicted herein.

What is claimed is:

1. A magnetically levitated railway comprising a track (2), which extends in a direction of travel (x) and includes high-speed and low-speed sections (2a, 2b), and comprising at least one vehicle (4), which is drivable along the track (2), and comprising a support, drive, and energy-generation system that is assigned to the vehicle (4), and that includes an elongated stator (3) which is attached to the track (2) and includes teeth (5) that are situated one behind the other, in alternation, in the direction of travel (x), and slots (6) that are designed to accommodate alternating-current windings, the support, drive, and energy-generation system also including at least one support magnet that is installed in the vehicle (4) and includes a plurality of support-magnet poles that are located one after the other in the direction of travel and are formed by cores (7) and magnet pole windings, and including a linear generator that includes linear generator windings (10) that have been inserted into the support-magnet poles,
wherein the teeth (5) and slots (6) of the elongated stator (3), and the cores (7) and the linear generator windings (10) of the support magnet are situated substantially parallel to one another in the high-speed sections (2a), but, in the low-speed sections (2b), are situated at an angle (α1, α2, β) that deviates from zero, and at a slant relative to one another.

2. The magnetically levitated railway as recited in claim 1, wherein the cores (7) and the linear generator windings (10) of the support magnet are situated substantially perpendicular to the direction of travel (x), while the teeth (5) and slots (6) of the elongated stator (3) extend substantially perpendicular to the direction of travel (x) in the high-speed sections (2a), but, in the low-speed sections (2b), extend at an angle relative to the direction of travel (x) that deviates from 90°.

3. The magnetically levitated railway as recited in claim 1, wherein the cores (7) and the linear generator windings (10) are situated at an angle relative to the direction of travel (x) that differs from 90°, while the teeth (5) and slots (6) of the elongated stator (3) are situated substantially perpendicularly to the direction of travel (x) in the low-speed sections (2b), but, in the high-speed sections (2a), extend substantially parallel to the cores (7) and the linear generator windings (10) of the support magnet.

4. The magnetically levitated railway as recited in claim 1, wherein the cores (7) and the linear generator windings (10) of the support magnet are situated at an angle relative to the direction of travel (x) that deviates from 90°, and wherein the teeth (5) and slots (6) of the elongated stator (3) are situated substantially parallel to the cores (7) and the linear generator windings (10) in the high-speed sections (2a), but, in the low-speed sections (2b), are situated at inclination angles (β) that are inverted relative to those in the high-speed sections (2a).

5. The magnetically levitated railway as recited in claim 4, wherein the inverted angles (α2, β) are of equal size.

* * * * *